United States Patent
Ryu et al.

(10) Patent No.: US 10,202,918 B2
(45) Date of Patent: Feb. 12, 2019

(54) SYSTEM AND METHOD FOR CONTROLLING VALVE TIMING OF CONTINUOUS VARIABLE VALVE DURATION ENGINE

(71) Applicant: HYUNDAI MOTOR COMPANY, Seoul (KR)

(72) Inventors: In Sang Ryu, Incheon (KR); Kyoung Pyo Ha, Seongnam-si (KR); You Sang Son, Suwon-si (KR); Kiyoung Kwon, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/340,778

(22) Filed: Nov. 1, 2016

(65) Prior Publication Data

US 2017/0167398 A1    Jun. 15, 2017

(30) Foreign Application Priority Data

Dec. 9, 2015 (KR) .................. 10-2015-0175141

(51) Int. Cl.
*F02D 41/00* (2006.01)
*F01L 1/047* (2006.01)
*F02D 13/02* (2006.01)

(52) U.S. Cl.
CPC ............ *F02D 41/009* (2013.01); *F01L 1/047* (2013.01); *F02D 13/0215* (2013.01);
(Continued)

(58) Field of Classification Search
CPC ............. F02D 13/0203; F02D 13/0207; F02D 13/0211; F02D 13/0215; F02D 13/0219;
(Continued)

(56) References Cited

U.S. PATENT DOCUMENTS 4,552,112 A * 11/1985 Nagao .................. F01L 1/26
                                                  123/308
5,080,055 A * 1/1992 Komatsu .............. F01L 1/08
                                                  123/90.11
(Continued)

FOREIGN PATENT DOCUMENTS

JP          07180514 A   *  7/1995
JP          10318001 A   * 12/1998
(Continued)

OTHER PUBLICATIONS

Non-Final Office Action dated May 16, 2018 from the corresponding U.S. Appl. No. 15/258,043, 9 pages.
(Continued)

*Primary Examiner* — John Zaleskas
(74) *Attorney, Agent, or Firm* — Brinks Gilson & Lione

(57) ABSTRACT

The present disclosure provides a system and a method for controlling valve timing of continuous variable valve duration engine. The method includes: classifying control regions depending on engine speed and engine load; applying a maximum duration to an intake valve and controlling valve overlap between the intake valve and an exhaust valve in a first control region; applying the maximum duration to the intake valve and reducing the valve overlap by using exhaust valve closing (EVC) timing in a second control region; advancing intake valve closing (IVC) timing according to an increase of the engine load in a third control region; controlling a throttle valve to be fully opened and controlling the EVC timing to an angle after top dead center in a fourth control region; and controlling the throttle valve to be fully opened and controlling the IVC timing according to the engine speed in a fifth control region.

6 Claims, 10 Drawing Sheets

(52) U.S. Cl.
CPC ..... *F02D 13/0261* (2013.01); *F02D 41/0002* (2013.01); *F02D 2041/001* (2013.01); *F02D 2041/002* (2013.01); *F02D 2200/101* (2013.01); *Y02T 10/18* (2013.01); *Y02T 10/42* (2013.01)

(58) Field of Classification Search
CPC ........ F02D 13/0223–13/0249; F02D 13/0261; F02D 41/0002; F02D 2041/001
USPC ...................................................... 123/90.15
See application file for complete search history.

(56) References Cited

U.S. PATENT DOCUMENTS

| | | | |
|---|---|---|---|
| 5,121,733 A | 6/1992 | Goto et al. | |
| 5,161,497 A * | 11/1992 | Simko | F02D 13/0219 123/90.15 |
| 5,224,460 A * | 7/1993 | Havstad | F01L 3/10 123/184.54 |
| 5,421,308 A * | 6/1995 | Hitomi | F02B 29/08 123/559.1 |
| 5,429,100 A | 7/1995 | Goto et al. | |
| 5,450,824 A * | 9/1995 | Yamane | F02D 13/023 123/90.15 |
| 5,469,818 A * | 11/1995 | Yoshioka | F01L 1/34406 123/90.15 |
| 5,622,144 A * | 4/1997 | Nakamura | F01L 1/34406 123/90.15 |
| 5,698,779 A * | 12/1997 | Yoshioka | F02D 13/0215 73/114.32 |
| 5,992,361 A * | 11/1999 | Murata | F01L 1/356 123/90.15 |
| 6,318,343 B1 | 11/2001 | Nakagawa et al. | |
| 6,336,436 B1 | 1/2002 | Miyakubo et al. | |
| 6,553,949 B1 | 4/2003 | Kolmanovsky et al. | |
| 6,619,242 B2 | 9/2003 | Kaneko | |
| 6,837,199 B2 | 1/2005 | Matsuura et al. | |
| 7,793,625 B2 | 9/2010 | Nakamura et al. | |
| 7,823,550 B2 | 11/2010 | Murata | |
| 8,205,587 B2 | 6/2012 | Murata et al. | |
| 8,235,015 B2 * | 8/2012 | Murata | F01L 1/047 123/90.15 |
| 8,677,957 B2 | 3/2014 | Goto et al. | |
| 8,887,691 B2 | 11/2014 | Chen et al. | |
| 9,863,331 B2 * | 1/2018 | Ryu | F02D 13/0215 |
| 9,863,340 B2 | 1/2018 | Ryu et al. | |
| 9,874,153 B2 | 1/2018 | Ryu et al. | |
| 9,874,154 B2 | 1/2018 | Ryu et al. | |
| 9,879,619 B2 | 1/2018 | Ryu et al. | |
| 9,889,838 B2 | 2/2018 | Ryu et al. | |
| 9,903,281 B2 | 2/2018 | Ryu et al. | |
| 9,932,883 B2 | 4/2018 | Iwai et al. | |
| 9,932,908 B2 | 4/2018 | Ryu et al. | |
| 9,964,050 B2 * | 5/2018 | Ryu | F02D 13/0215 |
| 10,006,378 B2 * | 6/2018 | Ryu | F02D 13/0215 |
| 2001/0025615 A1 * | 10/2001 | Nohara | F01L 13/0021 123/90.15 |
| 2001/0032605 A1 | 10/2001 | Kadowaki | |
| 2001/0050067 A1 * | 12/2001 | Sato | F01L 1/34 123/90.17 |
| 2003/0131805 A1 | 7/2003 | Yang | |
| 2004/0099244 A1 * | 5/2004 | Matsuura | F01L 1/022 123/432 |
| 2005/0235933 A1 | 10/2005 | Arai et al. | |
| 2006/0037571 A1 | 2/2006 | Machida | |
| 2006/0266311 A1 | 11/2006 | Fujii | |
| 2007/0181096 A1 | 8/2007 | Wagner et al. | |
| 2007/0272202 A1 | 11/2007 | Kuo et al. | |
| 2008/0029050 A1 | 2/2008 | Ichmura et al. | |
| 2009/0007564 A1 | 1/2009 | Suzuki et al. | |
| 2009/0031973 A1 * | 2/2009 | Murata | F02D 13/0238 123/90.16 |
| 2009/0272363 A1 | 11/2009 | Yun et al. | |
| 2010/0023242 A1 | 1/2010 | Kawamura | |
| 2010/0217504 A1 * | 8/2010 | Fujii | F01L 1/344 701/105 |
| 2012/0000197 A1 | 1/2012 | Maruyama et al. | |
| 2012/0004826 A1 | 1/2012 | Shimo et al. | |
| 2013/0206104 A1 | 8/2013 | Kuhlmeyer et al. | |
| 2015/0034052 A1 | 2/2015 | Shimizu | |
| 2015/0114342 A1 | 4/2015 | Iwai et al. | |
| 2015/0167508 A1 | 6/2015 | Ha | |
| 2015/0167509 A1 | 6/2015 | Ha | |
| 2017/0082037 A1 * | 3/2017 | Ryu | F01L 13/0015 |
| 2017/0167318 A1 * | 6/2017 | Ryu | F01L 13/0015 |
| 2017/0167393 A1 * | 6/2017 | Ryu | F02D 41/26 |
| 2017/0167394 A1 * | 6/2017 | Ryu | F02D 13/0215 |
| 2017/0167396 A1 * | 6/2017 | Ryu | F02D 41/0002 |
| 2017/0167398 A1 * | 6/2017 | Ryu | F02D 41/26 |
| 2017/0167399 A1 * | 6/2017 | Ryu | F02D 13/0215 |
| 2017/0167400 A1 * | 6/2017 | Ryu | F02D 13/0215 |
| 2017/0167401 A1 * | 6/2017 | Ryu | F01L 1/34 |
| 2017/0167402 A1 * | 6/2017 | Ryu | B60W 20/10 |
| 2017/0167403 A1 * | 6/2017 | Ryu | B60W 10/06 |
| 2017/0167404 A1 * | 6/2017 | Ryu | F02D 13/0215 |
| 2017/0167405 A1 * | 6/2017 | Ryu | F01L 13/0015 |
| 2017/0167406 A1 * | 6/2017 | Ryu | F01L 1/34 |
| 2017/0167407 A1 * | 6/2017 | Ryu | F01L 1/34 |
| 2017/0167408 A1 * | 6/2017 | Ryu | F02D 13/0215 |
| 2017/0167409 A1 * | 6/2017 | Ryu | F02D 13/0215 |
| 2017/0167414 A1 * | 6/2017 | Ryu | F02B 37/00 |
| 2017/0234243 A1 * | 8/2017 | Ryu | F02D 13/0207 123/350 |
| 2017/0268435 A1 * | 9/2017 | Ryu | F01L 1/34 |
| 2017/0268436 A1 * | 9/2017 | Ryu | F02D 13/0215 |
| 2017/0268437 A1 * | 9/2017 | Ryu | F01L 1/047 |
| 2018/0073455 A1 | 3/2018 | Barra | |
| 2018/0100444 A1 * | 4/2018 | Ryu | F01L 1/34 |
| 2018/0100445 A1 * | 4/2018 | Ryu | F02D 41/0235 |
| 2018/0100446 A1 * | 4/2018 | Ryu | F02D 41/009 |
| 2018/0100447 A1 * | 4/2018 | Ryu | F01L 13/0015 |
| 2018/0100448 A1 * | 4/2018 | Ryu | F02M 35/104 |
| 2018/0100452 A1 * | 4/2018 | Ryu | F01L 1/34 |
| 2018/0100453 A1 * | 4/2018 | Ryu | F01L 1/34 |
| 2018/0100454 A1 * | 4/2018 | Ryu | F02D 41/009 |

FOREIGN PATENT DOCUMENTS

| | | |
|---|---|---|
| JP | 2005-098150 | 4/2005 |
| JP | 2006-046293 A | 2/2006 |
| JP | 2006-336659 A | 12/2006 |
| JP | 2010-216464 A | 9/2010 |
| KR | 10-0321206 B1 | 1/2002 |
| KR | 10-2009-0013007 A | 2/2009 |
| WO | 2013/171830 A1 | 11/2013 |

OTHER PUBLICATIONS

Notice of Allowance dated May 16, 2018 from the corresponding U.S. Appl. No. 15/340,742, 52 pages.
Non-Final Office Action dated Aug. 24, 2018 from the corresponding U.S. Appl. No. 15/840,079, 41 pages.
Non-Final Office Action dated Sep. 28, 2018 from the corresponding U.S. Appl. No. 15/839,606, 33 pages.
Non-Final Office Action dated Oct. 5, 2018 from the corresponding U.S. Appl. No. 15/839,626, 19 pages.
Non-Final Office Action dated Oct. 10, 2018 from the corresponding U.S. Appl. No. 15/839,596, 29 pages.
Non-Final Office Action dated Dec. 11, 2018 from the corresponding U.S. Appl. No. 15/258,043, 18 pages.

* cited by examiner

SYSTEM AND METHOD FOR CONTROLLING VALVE TIMING OF CONTINUOUS VARIABLE VALVE DURATION ENGINE

CROSS-REFERENCE TO RELATED APPLICATION

This application claims priority to and the benefit of Korean Patent Application No. 10-2015-0175141, filed on Dec. 9, 2015, the entire contents of which are incorporated herein by reference.

FIELD

The present disclosure relates to a system and a method for controlling valve timing of a continuous variable valve duration engine.

BACKGROUND

The statements in this section merely provide background information related to the present disclosure and may not constitute prior art.

An internal combustion engine combusts mixed gas in which fuel and air are mixed at a predetermined ratio through a set ignition mode to generate power by using explosion pressure.

Generally, a camshaft is driven by a timing belt connected with a crankshaft that converts linear motion of a piston by the explosion pressure into rotating motion to actuate an intake valve and an exhaust valve, and while the intake valve is opened, air is suctioned into a combustion chamber, and while an exhaust valve is opened, gas which is combusted in the combustion chamber is exhausted.

To improve the operations of the intake valve and the exhaust valve and thereby improve engine performance, a valve lift and a valve opening/closing time (timing) are controlled according to a rotational speed or load of an engine. Therefore, a continuous variable valve duration (CVVD) device controlling opening duration of an intake valve and an exhaust valve of the engine and a continuous variable valve timing (CVVT) device controlling opening timing and closing timing of the intake valve and the exhaust valve of the engine have been developed.

The CVVD device adjusts opening duration of the valve. In addition, the CVVT device advances or retards the opening and closing timing of the valve in a state in which the duration of the valve is fixed. In other words, when the opening timing of the valve is determined, the closing timing is automatically determined according to the duration of the valve.

The above information disclosed in this Background section is only for enhancement of understanding of the background of the disclosure and therefore it may contain information that does not form the prior art that is already known to a person of ordinary skill in the art.

Further areas of applicability will become apparent from the description provided herein. It should be understood that the description and specific examples are intended for purposes of illustration only and are not intended to limit the scope of the present disclosure.

SUMMARY

The present disclosure provides a system and a method for controlling valve timing of a continuous variable valve duration engine having advantages of simultaneously controlling duration and timing of the continuous variable valve by mounting a continuous variable valve duration device and a continuous variable valve timing device on an intake and mounting a continuous variable valve timing device on an exhaust.

A method for controlling valve timing of an engine provided with a continuous variable valve duration (CVVD) device and a continuous variable valve timing (CVVT) device at an intake and a continuous variable valve timing (CVVT) device at an exhaust according to one form of the present disclosure may include: classifying a plurality of control regions depending on an engine speed and an engine load; applying a maximum duration to an intake valve and controlling a valve overlap between the intake valve and an exhaust valve in a first control region; applying the maximum duration to the intake valve and controlling the valve overlap to be reduced by using an exhaust valve closing (EVC) timing in a second control region; advancing an intake valve closing (IVC) timing according to an increase of the engine load in a third control region; controlling a throttle valve to be fully opened and controlling the EVC timing to an angle after top dead center (TDC) in a fourth control region; and controlling the throttle valve to be fully opened and controlling the IVC timing according to the engine speed in a fifth control region.

Intake valve opening (IVO) timing and the IVC timing may be fixed and the EVC timing may be set as a maximum value capable of maintaining combustion stability in the first control region.

The retardation amount of the EVC timing may be reduced according to an increase of the engine load in the second control region.

Intake valve duration (IVD) may be increased according to an increase of the engine speed by retarding the intake valve opening (IVO) timing and the IVC timing in the fifth control region.

The EVC timing may be controlled to be close to TDC to prevent or inhibit the valve overlap from generating in the fifth control region.

A system for controlling valve timing of a continuous variable valve duration engine according to one form of the present disclosure may include: a data detector detecting data related to a running state of a vehicle; a camshaft position sensor detecting a position of a camshaft; an continuous variable valve duration (CVVD) device controlling opening duration of an intake valve of the engine; an intake continuous variable valve timing (CVVT) device controlling opening timing and closing timing of the intake valve; an exhaust continuous variable valve timing (CVVT) device controlling opening timing and closing timing of an exhaust valve of the engine; and a controller configured to classify the running state of the vehicle into a plurality of control regions depending on an engine speed and an engine load based on signals from the data detector and the camshaft position sensor, and configured to control operations of the intake CVVD device, the intake CVVT device, and the exhaust CVVT device according to the control regions.

The controller applies a maximum duration to the intake valve and controls a valve overlap between the intake valve and the exhaust valve in a first control region, applies the maximum duration to the intake valve and controls the valve overlap to be reduced by using exhaust valve closing (EVC) timing in a second control region, advances intake valve closing (IVC) timing according to an increase of the engine load in a third control region, controls a throttle valve to be fully opened and controls the EVC timing to an angle after top dead center (TDC) in a fourth control region, and controls the throttle valve to be fully opened and controls the IVC timing according to the engine speed in a fifth control region.

The controller may fix an intake valve opening (IVO) timing and the IVC timing and may set the EVC timing as a maximum value capable of maintaining combustion stability in the first control region.

The controller may reduce the retardation amount of the EVC timing according to an increase of the engine load in the second control region.

The controller may increase intake valve duration (IVD) according to an increase of the engine speed by retarding intake valve opening (IVO) timing and the IVC timing in the fifth control region.

The controller may control the EVC timing to be close to TDC to prevent from generating the valve overlap in the fifth control region.

According to one form of the present disclosure, duration and timing of the continuous variable valve are simultaneously controlled, so the engine may be controlled under desirable conditions.

That is, since opening timing and closing timing of the intake valve and the exhaust valve are appropriately controlled, the fuel efficiency under a partial load condition and power performance under a high load condition are improved. In addition, a fuel amount for starting may be reduced by increasing a valid compression ratio, and exhaust gas may be reduced by shortening time for heating a catalyst.

Further, a fixed cam may be used instead of a continuous variable valve duration device in the exhaust, thereby reducing the additional cost.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
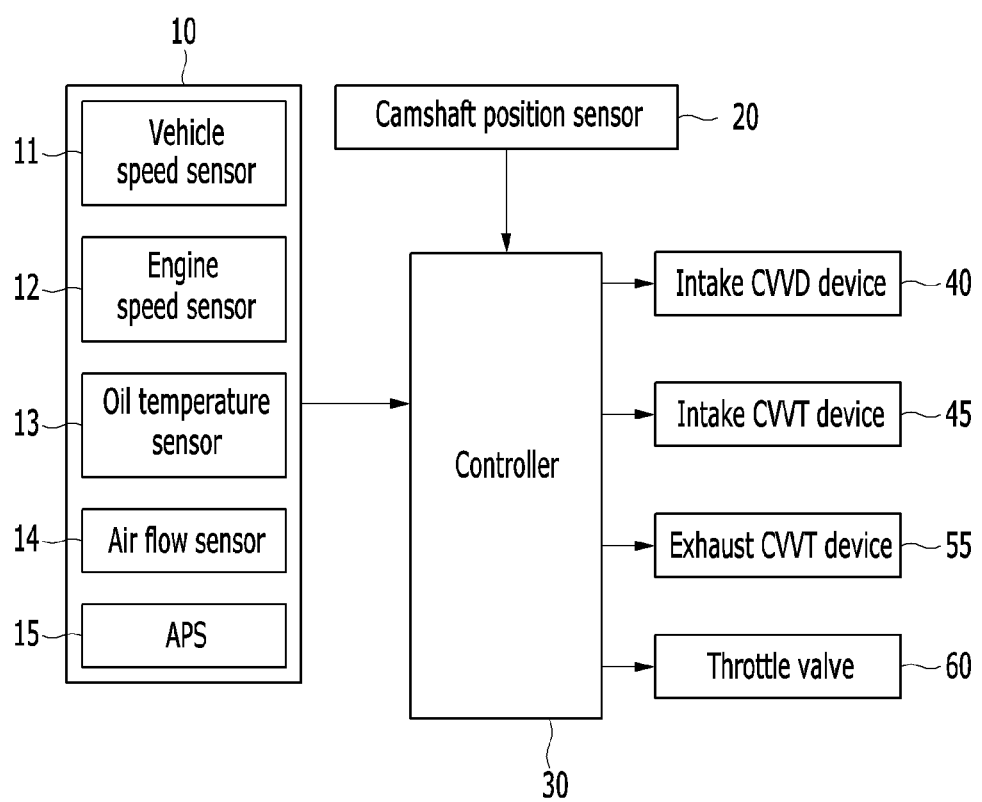
FIG. 1 is a schematic block diagram showing a system for controlling valve timing of a continuous variable valve duration engine according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

Throughout this specification and the claims which follow, unless explicitly described to the contrary, the word "comprise" and variations such as "comprises" or "comprising" will be understood to imply the inclusion of stated elements but not the exclusion of any other elements.

It is understood that the term "vehicle" or "vehicular" or other similar terms as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example a gasoline-powered and electric-powered vehicle.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

FIG. 1 is a schematic block diagram showing a system for controlling valve timing of a continuous variable valve duration engine according to an exemplary form of the present disclosure.

As shown in FIG. 1, a system for controlling valve timing of a continuous variable valve duration engine according to an exemplary form of the present disclosure includes a data detector 10, a camshaft position sensor 20, a controller 30, an intake continuous variable valve duration device 40, an intake continuous variable valve timing device 45, an exhaust continuous variable valve timing device 55, and a throttle valve 60, although other sensors or systems may be employed to detect or determine the desired data.

The data detector 10 detects data related to a running state of the vehicle for controlling the CVVD device and the CVVT devices, and includes a vehicle speed sensor 11, an engine speed sensor 12, an oil temperature sensor 13, an air flow sensor 14, and an accelerator pedal position sensor (APS) 15.

The vehicle speed sensor 11 detects a vehicle speed, and transmits a signal corresponding thereto to the controller 30. The vehicle speed sensor 11 may be mounted at a wheel of the vehicle.

The engine speed sensor 12 detects an engine speed from a change in phase of a crankshaft or camshaft, and transmits a signal corresponding thereto to the controller 30.

The oil temperature sensor (OTS) 13 detects temperature of oil flowing through an oil control valve (OCV), and transmits a signal corresponding thereto to the controller 30.

The oil temperature detected by the oil temperature sensor 13 may be determined by determining a coolant temperature using a coolant temperature sensor mounted at a coolant passage of an intake manifold. Therefore, in one form, the oil temperature sensor 13 may include the coolant temperature sensor, and the oil temperature should be understood to be the coolant temperature.

The air flow sensor 14 detects an air amount flowing into the intake manifold, and transmits a signal corresponding thereto to the controller 30.

The accelerator pedal position sensor 15 detects a degree at which a driver pushes an accelerator pedal, and transmits a signal corresponding thereto to the controller 30. A position value of the accelerator pedal is 100% when the accelerator pedal is pressed fully, and the position value of the accelerator pedal is 0% when the accelerator pedal is not pressed at all.

A throttle valve position sensor that is mounted on an intake passage may be used instead of the accelerator pedal position sensor 15. Therefore, in one form, the accelerator pedal position sensor 15 may include the throttle valve position sensor, and the position value of the accelerator pedal should be understood to be an opening value of the throttle value.

The camshaft position sensor 20 detects a position of a camshaft angle, and transmits a signal corresponding thereto to the controller 30.

Figure 2:
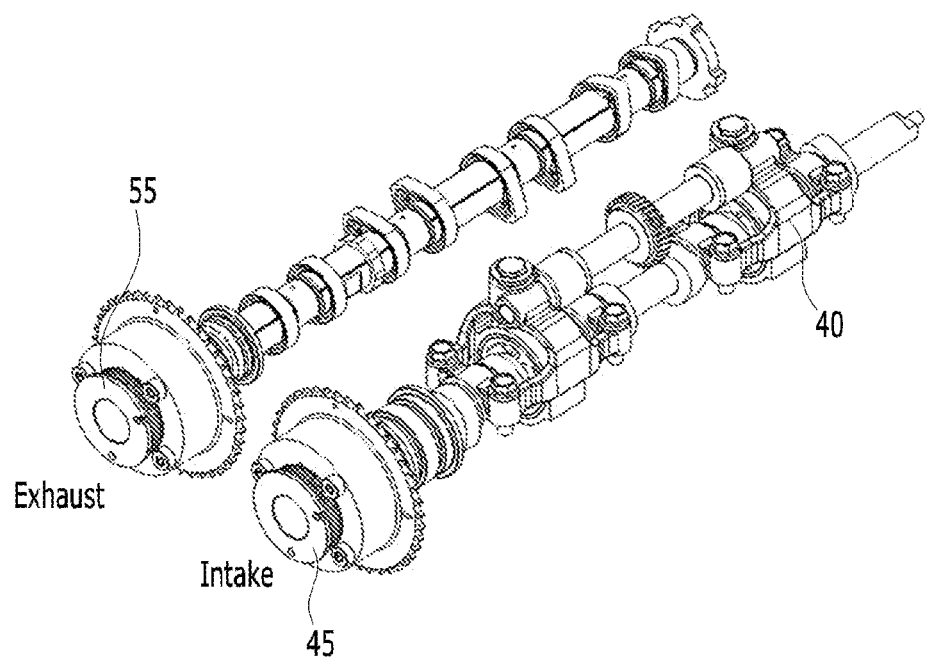
FIG. 2 is a perspective view showing an intake provided with a continuous variable valve duration device and a continuous variable valve timing device and an exhaust provided with a continuous variable valve timing device according to one form of the present disclosure.

FIG. 2 is a perspective view showing an intake provided with a continuous variable valve duration device and a continuous variable valve timing device and an exhaust provided with a continuous variable valve timing device according to one form of the present disclosure.

As shown in FIG. 2, the continuous variable valve duration device and the continuous variable valve timing device are mounted on the intake, and the continuous variable valve timing device is mounted on the exhaust through a fixed cam. Therefore, exhaust valve duration (EVD) is fixed. If the EVD becomes long, fuel efficiency and high speed performance of the vehicle may be improved, but low speed performance may be deteriorated. Thus, the EVD may be fixed at an angle of approximately 220 to 240 degrees.

The intake continuous variable valve duration (CVVD) device 40 controls opening duration of an intake valve of the engine according to a signal from the controller 30.

The intake continuous variable valve timing (CVVT) device 45 controls the opening timing and closing timing of the intake valve of the engine according to a signal from the controller 30, and the exhaust continuous variable valve timing (CVVT) device 55 controls the opening timing and closing timing of an exhaust valve of the engine according to a signal from the controller 30.

The throttle valve 60 adjusts the amount of air flowing into the intake manifold.

The controller 30 classifies a plurality of control regions depending on an engine speed and an engine load based on signals of the data detector 10 and the camshaft position sensor 20, and controls operations of the intake CVVD device 40, the intake CVVT device 45, the exhaust CVVT device 55, and the throttle valve 60. Herein, the plurality of control regions may be classified into five regions.

The controller 30 applies a maximum duration to the intake valve and controls valve overlap between the exhaust valve and the intake valve in a first control region, applies the maximum duration to the intake valve and controls the valve overlap to be reduced by using exhaust valve closing (EVC) timing in a second control region, advances intake valve closing (IVC) timing according to an increase of the engine load in a third control region, controls the throttle valve to be fully opened and controls the EVC timing to an angle after top dead center (TDC) in a fourth control region, and controls the throttle valve to be fully opened and controls the IVC timing according to the engine speed in a fifth control region.

For these purposes, the controller 30 may be implemented with at least one processor executed by a predetermined program, and the predetermined program may programmed in order to perform each step of a method for controlling valve timing of a continuous variable valve duration engine.

Various forms described herein may be implemented within a recording medium that may be read by a computer or a similar device by using software, hardware, or a combination thereof.

For example, the hardware of the forms described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electrical units designed to perform any other functions.

The software such as procedures and functions of the forms described in the present disclosure may be implemented by separate software modules. Each of the software modules may perform one or more functions and operations described in the present disclosure. A software code may be implemented by a software application written in an appropriate program language.

Hereinafter, a method for controlling valve timing of a continuous variable valve duration engine according to one form of the present disclosure will be described in detail with reference to FIG. 3A to FIG. 5C.

Figure 3A:
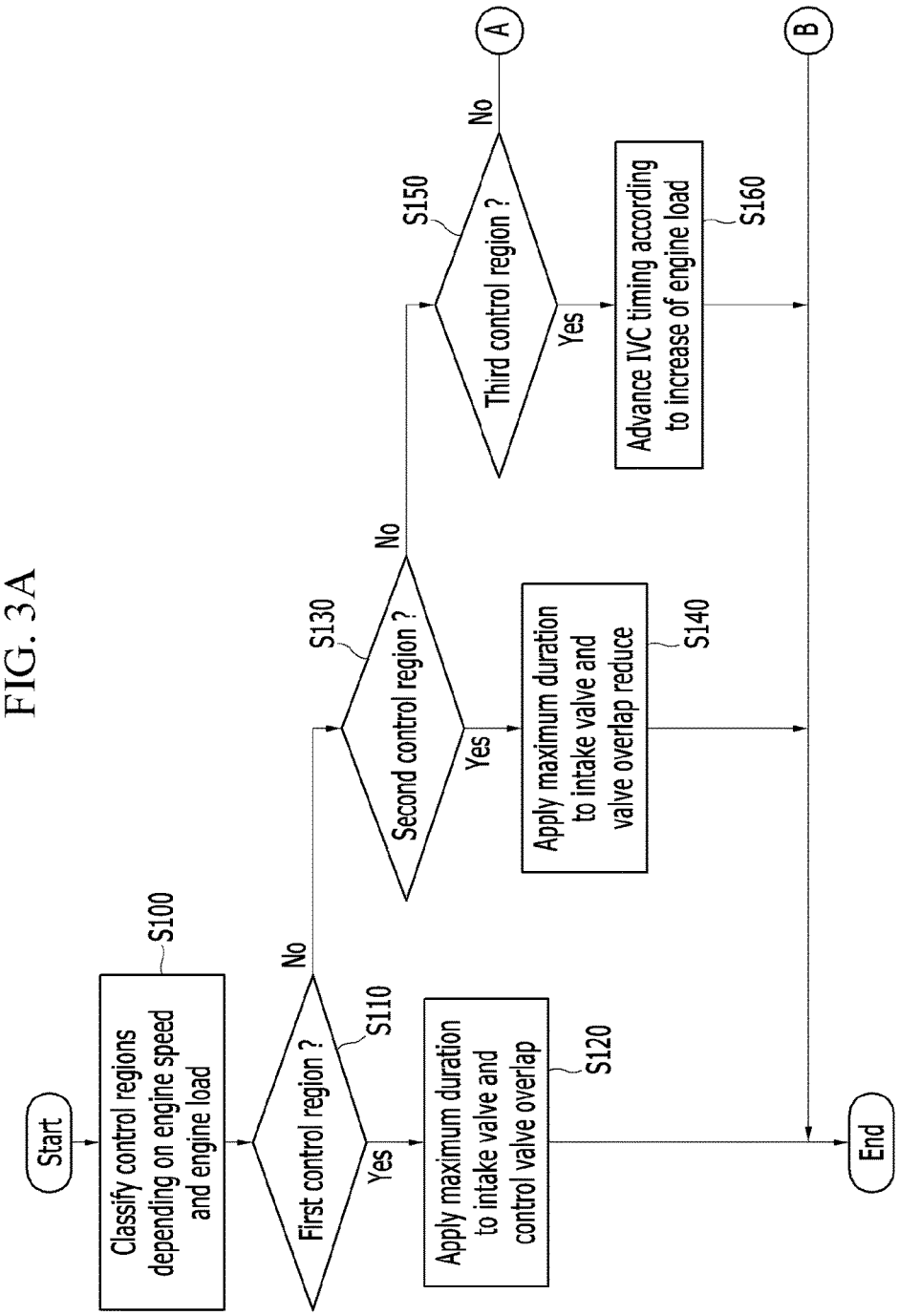
FIGS. 3A and 3B are flowcharts showing a method for controlling valve timing of a continuous variable valve duration engine according to one form of the present disclosure.
Figure 3B:
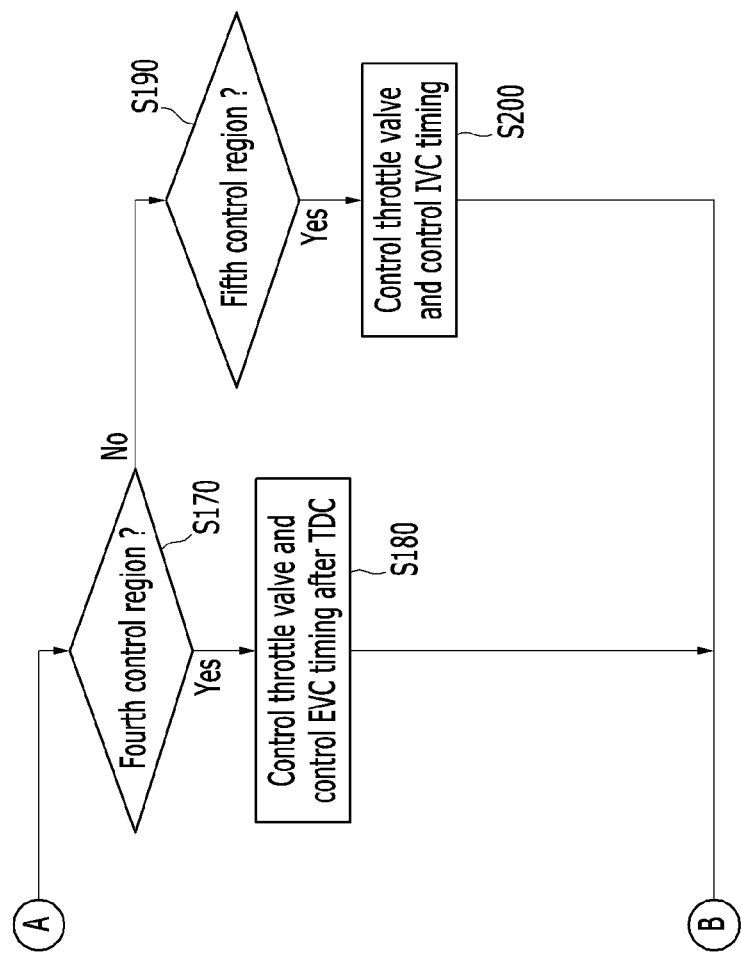
Figure 4A:
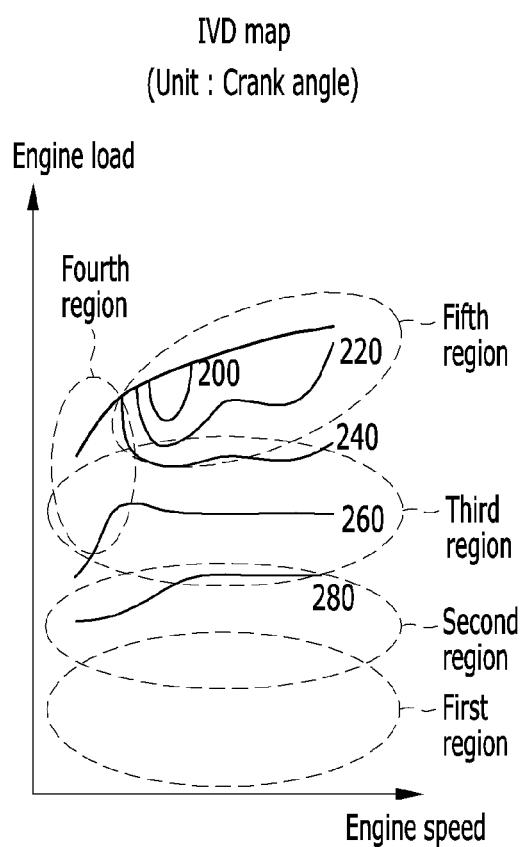
FIGS. 4A-4C are graphs showing duration, opening timing, and closing timing of an intake valve depending on an engine load and an engine speed according the present disclosure.
Figure 4B:
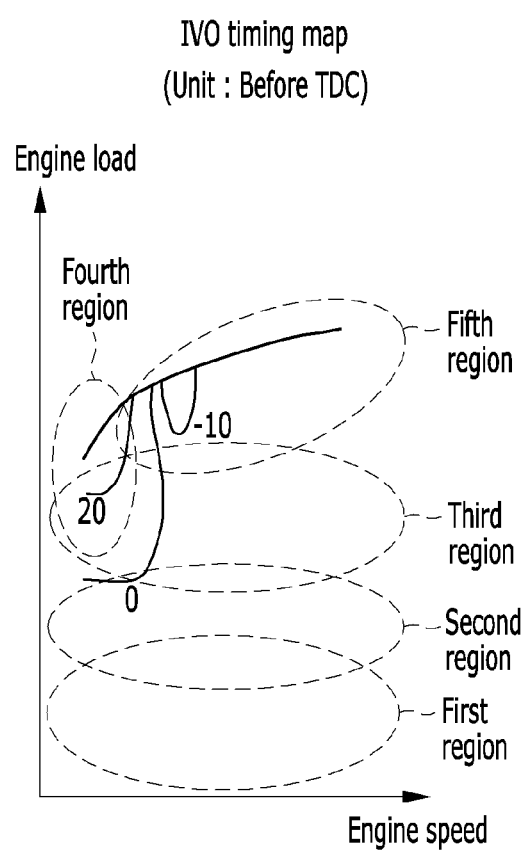
Figure 4C:
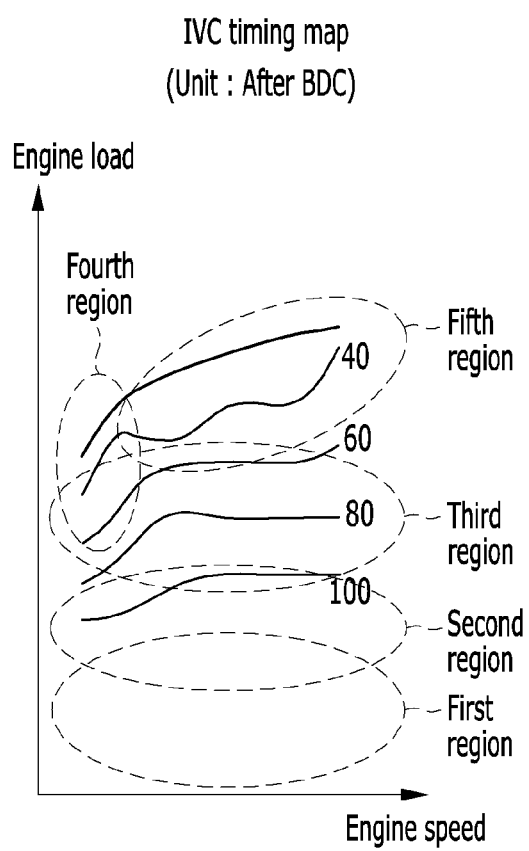
Figure 5A:
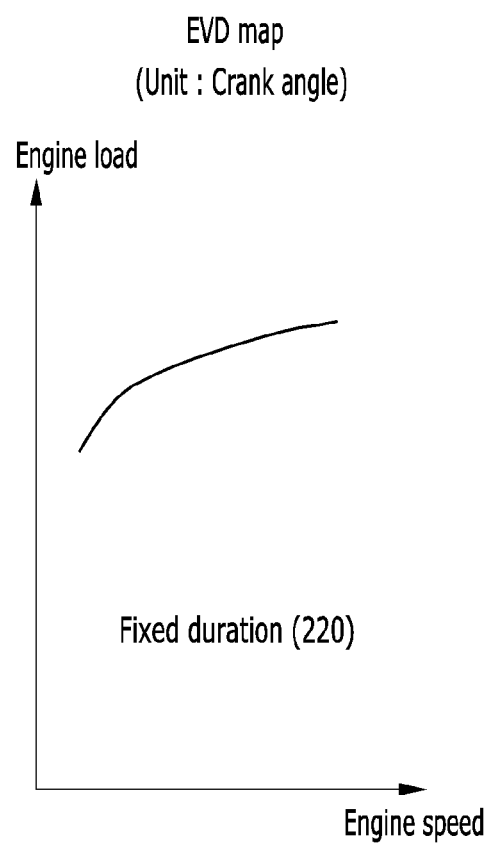
FIGS. 5A-5C are graphs showing duration, opening timing, and closing timing of an exhaust valve depending on an engine load and an engine speed according the present disclosure.
Figure 5B:
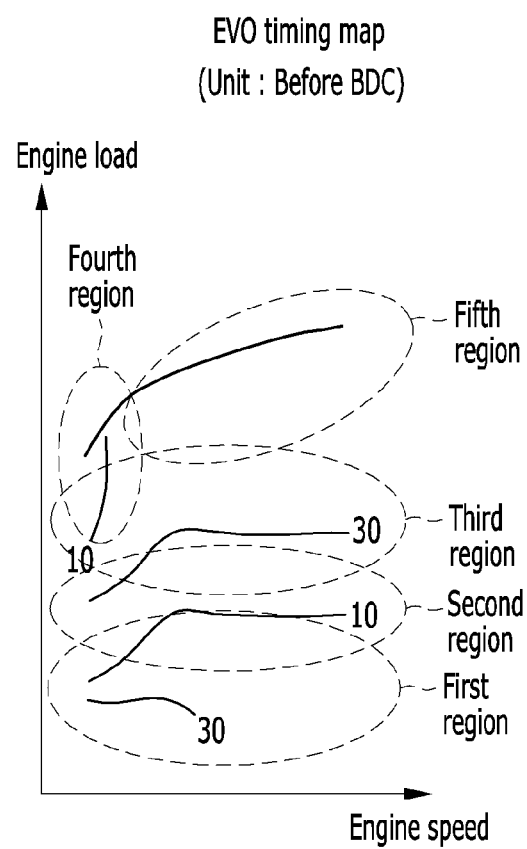
Figure 5C:
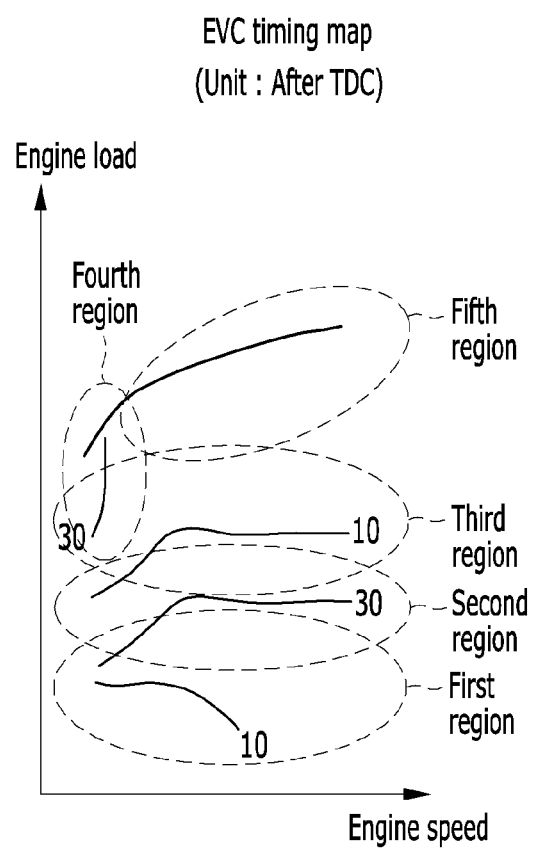

FIGS. 3A and 3B are flowcharts showing a method for controlling valve timing of a continuous variable valve duration engine. In addition, FIGS. 4A-4C are graphs showing duration, opening timing, and closing timing of an intake valve depending on an engine load and an engine speed, and FIGS. 5A-5C are graphs showing duration, opening timing, and closing timing of an exhaust valve depending on an engine load and an engine speed.

As shown in FIGS. 3A and 3B, a method for controlling valve timing of a continuous variable valve duration engine begins with classifying a plurality of control regions depending on an engine load and an engine speed at step S100. The first to fifth control regions are indicated in FIG. 4A to FIG. 5C.

The controller 30 may classify control regions as the first control region when the engine load is less than a first predetermined load, the second control region when the engine load is equal to or greater than the first predetermined load and less than a second predetermined load, and the third control region when the engine load is equal to or greater than the second predetermined load and less than a third predetermined load. In addition, the controller 30 may classify control regions as the fourth control region when the engine load is equal to or greater than the second predetermined load and the engine speed is less than a predetermined speed, and the fifth control region when the engine load is equal to or greater than the third predetermined load and the engine speed is equal to or greater than the predetermined speed.

Meanwhile, as shown in FIG. 4A to FIG. 5C, a crank angle is indicated in intake valve duration (IVD) map and an exhaust valve duration (EVD) map. For example, regarding the IVD map, a curved line indicated by '200' in the fifth control region means that the crank angel is approximately 200 degrees, and a curved line indicated by '220' means that the crank angle is approximately 220 degrees. Although not illustrated in FIG. 4A-4C, a curved line having a crank angle between approximately 200 and 220 degrees may exist between the curved lines.

In addition, a number designated in an intake valve opening (IVO) timing map represents before top dead center (TDC), a number designated an intake valve closing (IVC) timing map represents after bottom dead center (BDC), a number designated in an exhaust valve opening (EVO) timing map represents before BDC, and a number designated in an exhaust valve closing (EVC) timing map represents after TDC.

Regions and curved lines shown in FIG. 4A to FIG. 5C are just examples for describing one form of the present disclosure, and the present disclosure is not limited thereto.

When the control regions are classified depending on the engine load and the engine speed at step S100, the controller 30 determines whether a current engine state belongs to the first control region at step S110.

When the engine load is less than the first predetermined load at step S110, the controller 30 determines that the current engine state belongs to the first control region. In this case, the controller 30 applies the maximum duration to the intake valve and controls the valve overlap between the exhaust valve and the intake valve at step S120. The valve overlap represents a state in which the intake valve is opened and the exhaust valve is not yet closed.

In other words, when the engine is operated at a low load condition, the controller 30 may fix the IVO timing and the IVC timing to apply the maximum duration to the intake valve. As shown in FIGS. 4B and 4C, the IVO timing may be fixed at an angle of approximately 0 to 10 degrees before TDC, and the IVC timing may be fixed at an angle of approximately 100 to 110 degrees after BDC.

In addition, the controller 30 may set the EVC timing as a maximum value capable of maintaining combustion stability by moving the EVC timing in an after TDC direction. As the valve overlap is increased, fuel efficiency may be improved, but combustion stability may be deteriorated. Accordingly, properly setting of the valve overlap is desired. By setting the EVC timing as the maximum value capable of maintaining combustion stability, a valve overlap may be realized, and thus fuel efficiency may be improved.

When the current engine state does not belong to the first control region at step S110, the controller 30 determines whether the current engine state belongs to the second control region at step S130.

When the engine load is equal to or greater than the first predetermined load and less than the second predetermined load at step S130, the controller 30 determines that the current engine state belongs to the second control region. In this case, the controller 30 applies the maximum duration to the intake valve and controls the valve overlap to be reduced by using the EVC timing at step S140.

When the EVC timing is retarded in the after TDC direction, as the valve overlap is increased, intake pumping may be decreased, however, since the exhaust valve duration (EVD) is fixed, exhaust pumping may be increased as the EVO timing approaches BDC. In addition, the exhaust pumping may be increased as the engine load is increased in the second control region. Accordingly, the controller 30 may reduce the valve overlap by reducing retardation amount of the EVC timing according to an increase of the engine load.

In addition, the controller 30 may apply the maximum duration to the intake valve to prevent or inhibit knocking according to the increase of the engine load, and maintain a late intake valve close (LIVC) position at the angle of approximately 100 to 110 degrees after BDC.

When the current engine state does not belong to the second control region at step S130, the controller 30 determines whether the current engine state belongs to the third control region at step S150.

When the engine load is equal to or greater than the second predetermined load and is less than the third predetermined load, the controller 30 determines that the current engine state belongs to the third control region. In this case, the controller 30 advances the IVC timing according to the increase of the engine load at step S160.

In this case, the controller 30 may fix the exhaust CVVT device at a locking position by fixing the EVC timing.

When the current engine state does not belong to the third control region at step S150, the controller 30 determines whether the current engine state belongs to the fourth control region at step S170.

The controller 30 determines that the current engine state belongs to the fourth control region when the engine load is equal to or greater than the second predetermined load and the engine speed is less than the predetermined speed. In this case, the controller 30 controls the throttle valve to be fully opened and controls the EVC timing to an angle after TDC at step S180.

Since the engine speed is less than the predetermined speed (e.g., approximately 1500 rpm) in the fourth control region, the EVO timing should be close to BDC so as to reduce exhaust interference. Since the EVD is fixed in one form of the present disclosure, the controller 30 may control the EVC timing to an angle after TDC.

When the current engine state does not belong to the fourth control region at step S170, the controller 30 determines whether the current engine state belongs to the fifth control region at step S190.

When the engine load is equal to or greater than the third predetermined load and the engine speed is equal to or greater than the predetermined speed at step S190, the controller 30 determines that the current engine state belongs to the fifth control region. In this case, the controller 30 controls the throttle valve to be fully opened and controls the IVC timing according to the engine speed at step S200.

The controller 30 may increase the IVD according to the increase of the engine speed by retarding the IVO timing and the IVC timing. Since the IVC timing may be a significant factor in the fifth control region where the engine speed is equal to or greater than the predetermined speed (e.g., approximately 1500 rpm), the IVC timing is firstly controlled to a desired value according to the engine speed. The IVC timing may be gradually retarded from an angle of approximately 20 degrees to an angle of approximately 60 degrees after BDC according to the increase of the engine speed.

In this case, the controller 30 may generate a valve underlap by retarding the IVO timing in a medium speed (e.g., approximately 1500-3000 rpm). Accordingly, the IVD may be decreased and then increased when the engine speed increases.

In addition, the controller 30 may control the EVC timing to be close to TDC to prevent from generating the valve overlap.

Since a scavenging phenomenon that has occurred in the fourth control region disappears or is reduced as the exhaust pressure is increased, the valve overlap needs not to be generated. Accordingly, the controller 30 controls the EVC timing to be close to TDC.

Since the EVD is fixed in one form of the present disclosure, the controller 30 may control the EVO timing to an angle of approximately 40 to 50 degrees before BDC that is advantageous to exhaust pumping.

As described above, according to one form of the present disclosure, duration and timing of the continuous variable valve are simultaneously controlled, so the engine may be controlled under desired conditions.

That is, since opening timing and closing timing of the intake valve and the exhaust valve are appropriately controlled, the fuel efficiency under a partial load condition and power performance under a high load condition are improved. In addition, a fuel amount for starting may be reduced by increasing a valid compression ratio, and exhaust gas may be reduced by shortening time for heating a catalyst.

Since a fixed cam is used instead of a continuous variable valve duration device at the exhaust, production cost may be reduced with maintaining power performance.

While this disclosure has been described in connection with what is presently considered to be practical forms, it is to be understood that the disclosure is not limited to the disclosed forms, but, on the contrary, is intended to cover various modifications and equivalent arrangements included within the spirit and scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for controlling valve timing of an engine provided with a continuous variable valve duration (CVVD) device and a continuous variable valve timing (CVVT) device at an intake and a CVVT device at an exhaust, the method comprising:
    classifying, by a controller, a plurality of control regions depending on an engine speed and an engine load;
    applying, by the controller, a maximum duration to an intake valve and controlling a valve overlap between the intake valve and an exhaust valve in a first control region;
    applying, by the controller, the maximum duration to the intake valve and controlling the valve overlap to be reduced by using an exhaust valve closing (EVC) timing in a second control region;
    advancing, by the controller, an intake valve closing (IVC) timing according to an increase of the engine load in a third control region;
    controlling, by the controller, a throttle valve to be fully opened and controlling the EVC timing to an angle after a top dead center (TDC) in a fourth control region; and
    controlling, by the controller, the throttle valve to be fully opened and controlling the IVC timing according to the engine speed in a fifth control region,
    wherein an intake valve duration (IVD) is increased according to an increase of the engine speed by retarding an intake valve opening (IVO) timing and the IVC timing in the fifth control region, and the EVC timing is controlled to be close to the TDC to inhibit the valve overlap from generating in the fifth control region, and
    wherein a maximum value of the engine speed in the fourth control region is less than the corresponding maximum values of the engine speeds in the first, second, third, and fifth control regions,
    wherein a minimum value of the engine speed in the fifth control region is greater than a minimum value of the engine speed in the fourth control region,
    wherein minimum and maximum values of the engine load in the fourth control region are greater than the corresponding minimum and maximum values of the engine load in the first, second, and third control regions, respectively,
    wherein minimum and maximum values of the engine load in the fifth control region are greater than the corresponding minimum and maximum values of the engine load in the first, second, and third control regions, respectively, and
    wherein the maximum duration of the intake valve in the first and second control regions is obtained by respectively setting the IVO timing of the first and second control regions to be earlier than the IVO timings in respective portions of the third and fifth control regions and setting the IVC timing of the intake valve in the first and second control regions to be later than the IVC timing in a portion of the third control region and the IVC timings in the fourth and fifth control regions.

2. The method of claim 1, wherein the IVO timing and the IVC timing are fixed and the EVC timing is set as a maximum value capable of maintaining combustion stability in the first control region.

3. The method of claim 1, wherein a retardation amount of the EVC timing is reduced according to an increase of the engine load in the second control region.

4. A system for controlling valve timing of a continuous variable valve duration engine, the system comprising:
    a data detector configured to detect data related to a running state of a vehicle;
    a camshaft position sensor configured to detect a position of a camshaft;
    an intake continuous variable valve duration (CVVD) device configured to control an opening duration of an intake valve of the engine;
    an intake continuous variable valve timing (CVVT) device configured to control an opening timing and a closing timing of the intake valve;
    an exhaust CVVT device configured to control an opening timing and a closing timing of an exhaust valve of the engine; and
    a controller configured to classify a plurality of control regions depending on an engine speed and an engine load based on signals from the data detector, and configured to control operations of the intake CVVD device, the intake CVVT device, and the exhaust CVVT device according to the control regions;

wherein the controller applies a maximum duration to the intake valve and controls a valve overlap between the intake valve and the exhaust valve in a first control region, applies the maximum duration to the intake valve and controls the valve overlap to be reduced by using an exhaust valve closing (EVC) timing in a second control region, advances an intake valve closing (IVC) timing according to an increase of the engine load in a third control region, controls a throttle valve to be fully opened and controls the EVC timing to an angle after a top dead center (TDC) in a fourth control region, and controls the throttle valve to be fully opened and controls the IVC timing according to the engine speed in a fifth control region, wherein the controller increases an intake valve duration (IVD) according to an increase of the engine speed by retarding an intake valve opening (IVO) timing and the IVC timing in the fifth control region, and the controller controls the EVC timing to be close to the TDC to inhibit the valve overlap from generating in the fifth control region, wherein a maximum value of the engine speed in the fourth control region is less than the corresponding maximum values of the engine speeds in the first, second, third, and fifth control regions, wherein a minimum value of the engine speed in the fifth control region is greater than a minimum value of the engine speed in the fourth control region, wherein minimum and maximum values of the engine load in the fourth control region are greater than the corresponding minimum and maximum values of the engine load in the first, second, and third control regions, respectively, wherein minimum and maximum values of the engine load in the fifth control region are greater than the corresponding minimum and maximum values of the engine load in the first, second, and third control regions, respectively, and wherein the maximum duration of the intake valve in the first and second control regions is obtained by respectively setting the IVO timing of the first and second control regions to be earlier than the IVO timings in respective portions of the third and fifth control regions and setting the IVC timing of the intake valve in the first and second control regions to be later than the IVC timing in a portion of the third control region and the IVC timings in the fourth and fifth control regions.

5. The system of claim 4, wherein the controller fixes the IVO timing and the IVC timing and sets the EVC timing as a maximum value capable of maintaining combustion stability in the first control region.

6. The system of claim 4, wherein the controller reduces a retardation amount of the EVC timing according to an increase of the engine load in the second control region.

* * * * *